3,213,064
COPOLYMERS OF OXETANES AND ALDEHYDE
HYDRATES
Benjamin W. R. Song, New York, N.Y., assignor to
American Cyanamid Company, New York, N.Y., a
corporation of Maine
No Drawing. Filed Dec. 8, 1961, Ser. No. 158,110
4 Claims. (Cl. 260—67)

This invention relates to a process for the production of a novel group of polymers and to the polymers produced thereby. Further, this invention relates to novel compositions of matter, and more particularly to compositions of matter capable of producing glossy, continuous films having excellent chemical resistance, comprising a physical blend of a potentially thermosetting polymethyl ether of a polymethylol melamine and a copolymer of an oxetane compound and an aldehyde hydrate. More particularly, this invention relates to a method which comprises copolymerizing an oxetane compound with an aldehyde hydrate, to produce a novel copolymer thereof and blending said copolymer with a polymethyl ether of a polymethylol melamine. Still further, this invention relates to coating compositions comprising (1) physical mixtures of polymethyl ethers of polymethylol melamines and (2) copolymers of oxetane compounds and aldehyde hydrates.

One of the objects of the present invention is to prepare a novel composition of matter which is capable of producing glossy, continuous, scratch resistant films possessing excellent chemical resistance comprising a physical mixture of a polymethyl ether of a polymethylol melamine and a copolymer of an oxetane compound and an aldehyde hydrate. A further object of the present invention is to present a process for the production of a novel group of polymers, and to the polymers per se. A further object of the present invention is to prepare a novel group of copolymers which when blended with a polymethyl ether of a polymethylol melamine have the ability to form glossy, continuous, scratch resistant films having excellent chemical resistance. These and other objects will become more apparent to one skilled in the art upon reading the more detailed description set forth hereinbelow.

I have discovered a novel group of polymers which themselves may be used for such purposes as resin additives, adhesives, molding compounds and the like and a novel group of copolymers which are especially useful as coating compositions when blended with various polymethyl ethers of polymethylol melamines. Additionally, I have discovered that these mixtures of the copolymers of the present invention with the polymethyl ethers of polymethylol melamines produce excellent coatings having excellent properties, such as high flexibility, high heat resistance and excellent scratch and chemical resistance. These mixtures are exceptional when used to coat such articles as kitchen appliances, laundry appliances, automobiles and the like in that they are very hard and durable.

The novel polymers of the present invention are prepared by polymerizing an oxetane compound having the formula

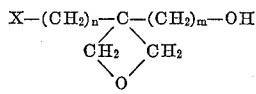

wherein X is a substituent selected from the group consisting of hydrogen, chlorine, bromine, fluorine, hydroxyl, cyano, amino, and alkoxy radicals, said alkoxy radical containing from about 1 to 8 carbon atoms and $n$ and $m$ are whole positive integers of from about 1 to 8, inclusive.

These oxetane compounds may be homopolymerized to form novel polymers useful as enumerated above, or may be copolymerized with various aldehyde hydrates to form copolymers which are particularly useful in the formation of the novel coating compositions of the present invention.

The polymerization is carried out at temperatures ranging from about 90° C. to about 200° C., preferably 100° C. to 150° C., and in the presence of an acid catalyst. Atmospheric pressure is generally utilized but where desired it is also possible to use superatmospheric or subatmospheric pressures. Generaly, such compounds as the strong inorganic acids, i.e. the strong mineral acids, such as for example, sulfuric, phosphoric, and the like or the aromatic acids, i.e. p-toluene sulfonic acid, may be used as catalysts for carrying out the polymerization process of this invention. The catalysts are used in concentrations of from about 0.1 to 2.0%, preferably 0.5 to 1.5%, based on the total weight of the monomer utilized.

The polymerization reaction may be carried out in the presence or in the absence of a solvent. Generally, any material which is a solvent for the monomer and polymer of the reaction system may be utilized, with such compounds as dioxane, nitrobenzene; aliphatic hydrocarbons such as hexane, heptane, octaine, and the like; aromatic hydrocarbons such as benzene, toluene, xylene and the like, being exemplary. These solvents are used in amounts ranging from about 25% to about 200%, preferably 50% to 150%, based on the total weight of the monomer utilized.

The reaction is allowed to continue until the reaction mass becomes very viscous, as evidenced by the formation of a gel-like material. The gel-like material usually manifests itself in from about 3 to 12 hours and the polymer is then recovered by precipitation from any nonsolvent for the polymer, e.g. water, filtered or otherwise separated, and dried. The polymers of the present invention, depending upon their molecular weight, are either very viscous liquids or hard solids at room temperature. In other words, when the polymers are of low molecular weight, they are generaly viscous liquids while the high molecular weight polymers are solid non-flowing compounds. Both varieties of polymers are, however, colorless, water-white materials.

Oxetane compounds which may be utilized in the present invention and which are represented by Formula I, above, include such compounds as 3,3-methyl hydroxymethyl oxetane, 3,3-ethyl hydroxymethyl oxetane, 3,3-propyl hydroxymethyl oxetane, 3,3-amyl hydroxymethyl oxetane, 3,3-hexyl hydroxymethyl oxetane, 3,3-heptyl hydroxymethyl oxetane, 3,3-octyl hydroxymethyl oxetane, 3,3-methyl hydroxyethyl oxetane, 3,3-ethyl hydroxyethyl oxetane, 3,3-propyl hydroxyethyl oxetane, 3,3-octyl hydroxyethyl oxetane, 3,3-methyl hydroxypropyl oxetane, 3,3-ethyl hydroxypropyl oxetane, 3,3-butyl hydroxypropyl oxetane, 3,3-octyl hydroxypropyl oxetane, 3,3-propyl hydroxyhexyl oxetane, 3,3-butyl hydroxyhexyl oxetane, 3,3-heptyl hydroxyhexyl oxetane, 3,3-octyl hydroxyhexyl oxetane, 3,3-methyl hydroxyoctyl oxetane, 3,3-amyl hydroxyoctyl oxetane, 3,3-oxetane dimethanol, 3,3-oxetane diethanol, 3,3-oxetane dipropanol, 3,3-oxetane dihexanol, 3,3-oxetane dioctanol, 3,3-hydroxymethyl hydroxypropyl oxetane, 3,3-hydroxybutyl hydroxyamyl oxetane, 3,3-hydroxyoctyl hydroxymethyl oxetane, 3,3-bromomethyl hydroxymethyl oxetane, 3,3-chloromethyl hydroxymethyl oxetane, 3,3-chloroethyl hydroxymethyl oxetane, 3,3-fluorobutyl hydroxypropyl oxetane, 3,3-bromooctyl hydroxyamyl oxetane, 3,3-aminomethyl hydroxyamyl oxetane, 3,3-aminoheptyl hydroxymethyl oxetane, 3,3-aminooctyl hydroxyethyl oxetane, 3,3-cyanomethyl hydroxyethyl oxetane, 3,3-cyanopropyl hydroxybutyl oxetane, 3,3-cyanohexyl hydroxyoctyl oxetane, 3,3-methoxymethyl hydroxyhexyl oxetane, 3,3-ethoxymethyl hydroxymethyl oxetane, 3,3-amyloxyethyl hydroxymethyl oxetane, 3,3-propoxybutyl hydroxypropyl oxetane, 3,3-octyloxyhexyl hydroxyheptyl oxetane and the like.

As mentioned above, copolymers of the oxetane compounds set forth hereinabove with aldehyde hydrates provide excellent coatings when blended with various polymethyl ethers of polymethylol melamines. It is possible to form copolymers of said oxetanes with various aldehyde hydrates, blend the copolymer with the polymethyl ether of the polymethylol melamine and produce films having the excellent physical and chemical properties set out heretofore. Copolymers of the oxetanes and aldehyde hydrates may be formed, under the same conditions set forth above, in regard to the homopolymerization of the oxetanes, and in a molar ratio of from about 0.2 to 1 to about 1 to 0.2, preferably about 1:1, respectively.

The aldehyde hydrates utilized are generally those well known in the art and such compounds as quinoline 6-aldehyde hydrate, quinoline 2-aldehyde hydrate, quinoline 4-aldehyde hydrate, phenyl glyoxal hydrate, bromal hydrate, butyl chloral hydrate, 2-chloropropionaldehyde hydrate, chloral hydrate and the like may be used to form the copolymers of the present invention. These copolymers have substantially the same physical properties and appearance as set forth above in regard to the oxetane homopolymers.

When forming the novel coating compositions of the present invention the first component is, of course, the copolymer of the oxetane compound and aldehyde hydrate, as mentioned hereinabove. The second principal component of the coating composition mixture of the present invention is a potentially thermosetting polymethyl ether of a polymethylol melamine. The polymethyl ether will encompass the dimethyl ether, the trimethyl ether, the tetramethyl ether, the penatmethyl ether, or the hexamethyl ether of polymethylol melamines. In preparing the polymethylol melamine, one must react at least 2 mols of formaldehyde, and preferably at least 3 mols of formaldehyde, with each mol of melamine under known reaction conditions in order to produce the polymethylol melamine such as trimethylol melamine and the like. The preferred methyl ether of polymethylol melamine is the hexamethoxy hexamethylol melamine. The blending of the oxetane copolymer with the polymethyl ether of the polymethylol melamine is affected by preparing about a 30% to 80% solution of the copolymer in a suitable solvent, such as dioxane, and blending the resulting solution with from about 15% to about 40% by weight, based on the weight of the copolymer, of the polymethyl ether of the polymethylol melamine.

After this blend has been prepared it is then cast onto a suitable substrate such as sheet steel, glass and the like and baked at a temperature of from about 125° C. to about 175° C. for a period of time of from about 15 to about 30 minutes, depending upon the reaction temperature, i.e. the higher the temperature, the shorter the reaction time. The baking treatment can be carried out with or without a catalyst. When a catalyst is utilized, any of the well-known acid catalysts may be employed, such as for example, p-toluene sulfonic acid. The amount of catalyst generally utilized will be from about 0.5 to 1.5%, based on the amount of the polymethyl ether of the polymethylol melamine present in the coating composition. The coatings resulting from the baking operation possess high flexibility, high heat resistance and excellent scratch and chemical resistance, as mentioned hereinabove, and more specifically set forth in the following examples.

Although the novel coating compositions of the present invention have been discussed primarily in connection with the oxetane-aldehyde hydrate copolymers, it is also possible to form novel coating compositions utilizing only the oxetane homopolymers as the polymeric component. However, when the latter compositions are cast into films, the properties thereof, although superior to most commerically available film-forming compositions, are nevertheless, somewhat inferior to those film-forming compositions wherein the oxetane-aldehyde hydrate copolymer is employed as the polymeric component.

The following examples are for purposes of illustration only and are not to be construed as limitations on the instant invention except as set forth in the appended claims. All parts and percentages are by weight unless otherwise indicated.

*Example 1*

Into a suitable reaction vessel, equipped with suitable inlets and outlets, are charged 10 parts of chloral hydrate which is dissolved in 22 parts of 3,3-ethyl hydroxymethyl oxetane. Concentrated sulfuric acid (0.06 part) is then added and the mixture is heated to 100° C. In approximately 5 hours a viscous, sticky, gel-like material forms. This material is dissolved in acetone and is then precipitated from water. The precipitate is recovered by filtration and dried. An 86% yield of the copolymer is realized. The copolymer has a chlorine content of 17.4%, an oxygen content of 25.36% and an intrinsic viscosity of 0.02.

*Example 2*

The copolymer produced in Example 1 is blended with 10 parts of hexamethoxy hexamethylol melamine in dioxane. The resulting blended mixture is cast onto sheet steel and baked at 150° C. for 15 minutes. A clear, scratch-resistant film forms which has the following chemical resistance:

| | |
|---|---|
| 5% NaOH | Over 5 days. |
| Xylene | Over 5 days. |
| 50% acetic acid | 4 hours. |

*Example 3*

Into a suitable reaction vessel, equipped as in Example 1, are charged 23 parts of 3,3-propylhydroxy octyl oxetane and 17 parts of phenyl glyoxal hydrate in a solution of 20 parts of dioxane. To this solution is then added 0.4 part of concentrated sulfuric acid. The resultant mixture is heated to 120° C. for about 8 hours. A solid polymeric material forms, is dissolved in acetone and precipitated from water. The copolymer is recovered by precipitation in a realized yield of 83%. It is water-white in color and relatively hard.

*Example 4*

A blend of 15 parts of the copolymer produced in Example 3 and 5 parts of the dimethyl ether of trimethylol melamine is prepared. Films are drawn down on glass and steel panels and are baked for 20 minutes at 140° C. They give clear, hard, scratch resistant films having chemical properties similar to that of Example 2. Pigmented coatings of this mixture show a high degree of gloss and color and outstanding color retention after overbaking.

*Example 5*

The procedure of Example 1 is followed except that 3,3-oxetane dimethanol and butyl chloral hydrate are substituted for the monomers set forth therein. After heating at about 120° C. for 6 hours, a copolymer forms which is recovered by precipitation and filtration. The copolymer is water-white in color and has other properties similar to those of the copolymer produced in Example 1.

*Example 6*

The copolymer produced in Example 5 (20 parts) is blended with 5 parts of a solution of hexamethoxy hexamethylol melamine in dioxane. Films drawn from the mixture by utilizing an applicator blend on glass and steel panels are baked as in Example 4. The films produced are hard, glossy, clear and display excellent resistance to dilute alkali and acidic solutions.

*Example 7*

Utilizing the procedure of Example 1, a copolymer of 3,3-hydroxymethyl hydroxypropyl oxetane and quinoline 4-aldehyde hydrate, 9 parts to 7 parts, respectively, is prepared. When 35 parts of this copolymer is blended with 12 parts of hexamethoxy hexamethylol melamine in dioxane and formed into a film according to the procedure of Example 2, a clear, scratch-resistant film is produced which exhibits excellent chemical resistance in regard to dilute alkali and acid solutions.

*Example 8*

The procedure of Example 1 is again followed in producing a copolymer of 3,3-chloromethyl hydroxymethyl oxetane and 2-chloropropionaldehyde hydrate (14 parts to 9 parts, respectively). A 78% yield is recovered and this copolymer is blended with 5 parts of the dimethyl ether of trimethylol melamine in dioxane. A film is cast from this blend utilizing the baking procedure of Example 4 and when formed exhibits excellent scratch-resistance and resistance to dilute alkali and acid solutions.

*Example 9*

Utilizing the procedure of Example 1, a copolymer is prepared utilizing 52 parts of 3,3-aminooctyl hydroxyethyl oxetane and 60 parts of bromal hydrate. A solution of the copolymer in acetone is produced and 50 parts of rutile titanium dioxide is added to 50 parts of the copolymer solution by grinding the mixture in a 3 roll roller mill. 70 parts of the resultant product are physically blended with 25 parts of a hexamethoxy hexamethylol melamine solution in dioxane. The resultant blend is cast onto sheet steel and dried for 30 minutes at about 120° C. The resultant coating thus produced is hard, glossy and has a snow-white color.

*Example 10*

A copolymer is produced, utilizing the procedure set forth in Example 1, of 30 parts of 3,3-cyanopropyl hydroxybutyl oxetane and 18 parts of quinoline 6-aldehyde hydrate. The resultant copolymer is ground together with titanium dioxide pigment in a ratio of 3 parts of the pigment to 1 part of the copolymer. Additional parts of copolymer are then added so that the final ratio is 100% pigment to 100% copolymer or a 1:1 weight basis. The resultant mixture is added to 15 parts of a dimethyl ether of a trimethylol melamine solution in dioxane and is cast onto sheet steel. The sheet steel is permitted to air dry for 20 minutes at room temperature and is then baked for 30 minutes at 100° C. The finish obtained in this manner is hard and glossy and shows especially good resistance to 5% solutions of sodium hydroxide, 50% solutions of acetic acid and dilute synthetic detergent solutions at elevated temperatures. When a similarly coated sheet is given an additional heat treatment for 5 minutes at 250° C. it suffers very little in loss of gloss or color. Under these same conditions of high temperature heating, a conventional commercially available variation comprising a blend of alkyd resin and a melamine resin undergoes deterioration in color and gloss.

*Example 11*

Utilizing the procedure of Example 3, a copolymer of 3,3-ethoxymethyl hydroxymethyl oxetane and chloral hydrate (15 parts to 17 parts) is produced in a 79% yield. 18 parts of this copolymer is blended with 7 parts of hexamethoxy hexamethylol melamine in dioxane solution and is cast onto plate glass. The glass is baked at 150° C. for 15 minutes and a clear, scratch-resistant film is produced, which when contacted with dilute solutions of alkali and acid does not deteriorate.

*Example 12*

Into a suitable reaction vessel, equipped as in Example 1, are added 25 parts of 3,3-ethyl, hydroxymethyl oxetane. To the vessel is then added 0.6 part of concentrated phosphoric acid. The resultant mixture is then heated to 125° C. for approximately 4 hours. A thick, gel-like material then forms. This material is dissolved in acetone and is precipitated from water. The precipitate is recovered by centrifugation and dried in an oven. A yield of 83% of homopolymer is recovered.

This homopolymer is then physically blended with 15 parts of the hexamethyl ether of hexamethylol melamine in dioxane solution. The resultant blend is cast onto plate glass and baked at 150° C. for 20 minutes. A clear, scratch-resistant film is produced which is completely unaffected by dilute alkali and acid solutions, after 3 days and 3 hours, respectively.

*Example 13*

Utilizing the procedure of Example 12, except that 3,3-oxetane diethanol was substituted for the 3,3-ethyl hydroxymethyl oxetane, a film, clear in color and scratch-resistant is formed. When contacted with dilute solutions of common household detergents, no effect is visible, after 3 days.

It will be quite apparent to those skilled in the art that other pigments may be used to produce a broad variety of colored coating compositions or, if desired, pigments or dyes or other coloring materials may be omitted to produce clear, transparent finishes. With certain pigments, it may be desirable and sometimes advantageous to use them in the form of aqueous slurries since, in the course of their preparation, they are generally obtained in admixture with varying amounts of water as a result of filtration. For use with organic solvents, these pigments must be thoroughly dried, but when an aqueous solvent is involved, the drying of the pigments is unnecessary.

The use of hexamethyl ether of hexamethylol melamine as the potentially thermosetting melamine-formaldehyde methyl ether component, is preferred over a less highly substituted melamine such as the dimethyl ether of trimethylol melamine since greater storage stability of the blend results.

Coating compositions prepared with titanium dioxide as the pigment with the hexamethyl ether of hexamethylol melamine produce baked films which show no lowering of gloss after the coating composition has been stored at room temperature for 3 months compared to a film prepared immediately after the coating composition was prepared. This indicates continued compatibility of the components, even after prolonged storage. Generally, the lower methylated and methylolated melamines have not shown such storage stability so that the coating compositions would have to be used within a few months after being prepared.

I claim:

1. A copolymer of an oxetane compound having the formula

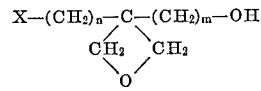

wherein X is a substituent selected from the group consisting of hydrogen, chlorine, bromine, fluorine, hydroxy, cyano, amino, and alkoxy radicals, said alkoxy radical containing from 1 to 8 carbon atoms, inclusive, and $n$ and $m$ are whole positive integers of from 1 to 8, inclusive, and an aldehyde hydrate selected from the group consisting of quinoline-2-aldehyde hydrate, quinoline-4-aldehyde hydrate, quinoline-6-aldehyde hydrate, chloral hydrate, 2-chloropropionaldehyde hydrate, butyl chloral hydrate, bromal hydrate and phenyl glyoxal hydrate.

2. A copolymer of 3,3-ethyl hydroxymethyl oxetane and chloral hydrate.

3. A method for the production of a polymer which comprises copolymerizing an oxetane compound having the formula

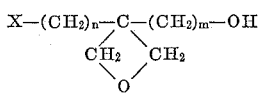

wherein X is a substituent selected from the group consisting of hydrogen, chlorine, bromine, fluorine, hydroxy, cyano, amino, and alkoxy radicals, said alkoxy radical containing from 1–8 carbon atoms, inclusive, and $n$ and $m$ are positive, whole integers of from 1–8, inclusive, and an aldehyde hydrate selected from the group consisting of quinoline-2-aldehyde, hydrate, quinoline-4-aldehyde hydrate, quinoline-6-aldehyde hydrate, chloral hydrate, 2-chloropropionaldehyde hydrate, butyl chloral hydrate, bromal hydrate and phenyl glyoxal hydrate, at a temperature of from about 90° C. to about 200° C. and in the presence of an acid catalyst selected from the group consisting of sulfuric acid, phosphoric acid and p-toluene sulfonic acid.

4. A method according to claim 3 wherein the oxetane compound is 3,3-ethyl hydroxymethyl oxetane and the aldehyde hydrate is chloral hydrate.

References Cited by the Examiner

UNITED STATES PATENTS

| | | | |
|---|---|---|---|
| 2,895,922 | 7/59 | Goddu | 260—2 |
| 3,000,901 | 9/61 | Wyler | 260—2 |

FOREIGN PATENTS 758,450  10/56  Great Britain.

OTHER REFERENCES

Farthing: Chemical Society Journal, 1955, Part 4, pages 3648–3654.

Blais: Amino Resins, Reinhold Publishing Corp., New York, 1959, pages 192–195 relied upon.

MURRAY TILLMAN, *Primary Examiner*.

LEON J. BERCOVITZ, *Examiner*.